(12) United States Patent
Sippel et al.

(10) Patent No.: US 10,281,045 B2
(45) Date of Patent: May 7, 2019

(54) APPARATUS AND METHODS FOR SEALING COMPONENTS IN GAS TURBINE ENGINES

(71) Applicants: Rolls-Royce Corporation, Indianapolis, IN (US); Rolls-Royce North American Technologies, Inc., Indianapolis, IN (US)

(72) Inventors: Aaron D. Sippel, Zionsville, IN (US); Ted J. Freeman, Danville, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 530 days.

(21) Appl. No.: 15/049,747

(22) Filed: Feb. 22, 2016

(65) Prior Publication Data

US 2016/0245108 A1 Aug. 25, 2016

Related U.S. Application Data

(60) Provisional application No. 62/118,497, filed on Feb. 20, 2015.

(51) Int. Cl.
*F16J 15/44* (2006.01)
*F01D 11/00* (2006.01)

(52) U.S. Cl.
CPC ............ *F16J 15/44* (2013.01); *F01D 11/005* (2013.01); *F05D 2230/60* (2013.01); *F05D 2240/55* (2013.01); *Y02T 50/672* (2013.01)

(58) Field of Classification Search
CPC .................... F16J 9/12; F16J 9/14; F16J 15/44
(Continued)

(56) References Cited

U.S. PATENT DOCUMENTS 1,358,243 A * 11/1920 Pitner .................... F16J 9/14
277/486
1,423,466 A 7/1922 Snyder
(Continued)

FOREIGN PATENT DOCUMENTS

JP 58176402 A 10/1983
JP 2000204901 A 7/2000
JP 5776208 B2 9/2015

OTHER PUBLICATIONS

GE Aviation, Jefferies Investor Visit, dated May 12, 2014, 78 pg. (p. 32).

*Primary Examiner* — Kristina R Fulton
*Assistant Examiner* — L. Susmitha Koneru
(74) *Attorney, Agent, or Firm* — Barnes & Thornburg LLP

(57) ABSTRACT

An apparatus adapted for use in a gas turbine engine includes a first circumferential member and a second circumferential member. The first circumferential member includes an end portion that defines a recess and includes a first seal surface. The second circumferential member includes an end portion that includes a second seal surface. The end portion of the second circumferential member is configured to be at least partially disposed in the recess of the first circumferential member to collectively form at least a portion of a circumferential assembly of a gas turbine. The first seal surface of the first circumferential member is forms a first seal with a seal member and the second seal surface of the second circumferential member is forms a second seal with the seal member when the end portion of the second circumferential member is disposed in the recess of the first circumferential member.

16 Claims, 6 Drawing Sheets

(58) Field of Classification Search
USPC .................. 277/493–499, 546, 547, 631
See application file for complete search history.

(56) References Cited

U.S. PATENT DOCUMENTS

| | | | | |
|---|---|---|---|---|
| 2,412,734 | A * | 12/1946 | Iliffe | ............ F16J 9/14 277/445 |
| 3,375,016 | A | 3/1968 | Jellinek et al. | |
| 3,655,208 | A * | 4/1972 | Walker | ............ F16J 9/28 277/496 |
| 3,661,197 | A | 5/1972 | Peterson | |
| 3,990,813 | A | 11/1976 | Imai et al. | |
| 4,635,896 | A | 1/1987 | Baker | |
| 5,169,159 | A * | 12/1992 | Pope | ............ F16J 15/441 277/422 |
| 5,188,506 | A | 2/1993 | Creevy | |
| 5,988,975 | A | 11/1999 | Pizzi | |
| 6,464,456 | B2 | 10/2002 | Darolia et al. | |
| 6,808,363 | B2 | 10/2004 | Darkins, Jr. et al. | |
| 6,832,484 | B2 | 12/2004 | Hofmann et al. | |
| 6,893,214 | B2 | 5/2005 | Alford et al. | |
| 7,080,513 | B2 | 7/2006 | Reichert | |
| 7,347,425 | B2 | 3/2008 | James | |
| 7,360,769 | B2 | 4/2008 | Bennett | |
| 7,374,395 | B2 | 5/2008 | Durocher et al. | |
| 7,520,721 | B2 | 4/2009 | Hamlin et al. | |
| 7,744,096 | B2 | 6/2010 | Kona | |
| 7,771,159 | B2 | 8/2010 | Johnson et al. | |
| 7,870,738 | B2 | 1/2011 | Zborovsky et al. | |
| 8,047,550 | B2 | 11/2011 | Behrens et al. | |
| 8,047,773 | B2 | 11/2011 | Bruce et al. | |
| 8,074,995 | B2 * | 12/2011 | Vasagar | ............ F16J 15/3244 277/301 |
| 8,079,600 | B2 | 12/2011 | Shojima et al. | |
| 8,157,511 | B2 | 4/2012 | Pietrobon et al. | |
| 8,303,245 | B2 | 11/2012 | Foster et al. | |
| 8,790,067 | B2 | 7/2014 | McCaffrey et al. | |
| 2004/0195783 | A1 | 10/2004 | Akagi et al. | |
| 2008/0069688 | A1 | 3/2008 | Harper et al. | |
| 2009/0097980 | A1 | 4/2009 | Hayasaka et al. | |
| 2009/0194948 | A1 * | 8/2009 | Wirt | ............ F16J 9/14 277/345 |
| 2012/0070272 | A1 | 3/2012 | Prehn | |
| 2012/0171040 | A1 | 7/2012 | Walunj et al. | |
| 2013/0156550 | A1 | 6/2013 | Franks et al. | |
| 2013/0202433 | A1 | 8/2013 | Hafner | |

\* cited by examiner

APPARATUS AND METHODS FOR SEALING COMPONENTS IN GAS TURBINE ENGINES

CROSS REFERENCE TO RELATED APPLICATIONS

This application claims priority to and the benefit of U.S. Provisional Patent Application No. 62/118,497, filed 20 Feb. 2015, the disclosure of which is now expressly incorporated herein by reference.

FIELD OF THE DISCLOSURE

The embodiments described herein relate generally to gas turbine engines, and more particularly, to sealing members and methods for sealing components within a gas turbine engine, especially those that include ceramic matrix composite (CMC) components therein.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted (e.g., by rotating a series of blades of the turbine) to drive the compressor and, in some cases, an output shaft. Byproducts of the combustion are exhausted out of the turbine.

Compressors and turbines typically include alternating stages of static vane assemblies and rotating wheel assemblies. The rotating wheel assemblies include series of disks carrying blades around their outer edges. Thus, as the products of the combustion reaction flow though the turbine, the static vane assembly of a given stage directs the flow of the combustion products toward the blades of the rotating disk assembly for the corresponding stage. The hot gases produce a rotation of the rotating disk assembly. When the rotating disk assemblies rotate, tips of the blades move along blade tracks included in shrouds that are arranged around the rotating wheel assemblies.

During operation, the tips of the blades included in the rotating wheel assemblies typically move inwardly and outwardly relative to a centerline of the engine due to changes in centrifugal force and temperatures experienced by the blades. Because of this movement inwardly and outwardly relative to the centerline, turbine shrouds are often designed to allow clearance between the blade tips and the blade tracks. This clearance, however, can allow combustion products to pass over the blades (e.g., radially outside of a circumference of the rotating wheel assembly) without pushing the blades, thereby contributing to lost performance within the gas turbine engine. Moreover, in some instances, the blade tips contact the blade tracks arranged around the rotating wheel assemblies and cut grooves into the blade tracks further contributing to lost performance within a gas turbine engine.

In an effort to mitigate such losses, a shroud surrounding a rotating disk assembly can be formed from a number of blade track segments, members, and/or subassemblies. In these designs, the blade track segments can be allowed to move independently in a radial direction in response to a radially inward and/or radially outward movement of the rotating wheel assembly. Thus, wear to the blade track resulting from contact with the blade tips can be reduced. While losses due to wear and fatigue of the blade tracks can be reduced by forming the blade track from multiple blade track segments, a leak path may result between adjacent blade track segments, which in turn can lead to losses resulting from a flow of the combustion products through the leak path. Thus, in some known turbine engines, sealing elements can be disposed between adjacent blade track and/or shroud segments. Such known sealing elements are often disposed within complex grooves formed in the matting segments. Thus, accommodating known sealing elements often increases time, labor, and cost of manufacturing and/or assembling a shroud or blade track.

Thus, a need exists for improved sealing members included in turbine shroud assemblies and methods for manufacturing the same.

SUMMARY

In illustrative embodiment of the present disclosure, an apparatus includes a first circumferential member and a second circumferential member. The first circumferential member includes an end portion that defines a recess and includes a first seal surface. The second circumferential member includes an end portion that includes a second seal surface. The end portion of the second circumferential member is configured to be at least partially disposed in the recess of the first circumferential member to collectively form at least a portion of a circumferential assembly of a gas turbine. The first seal surface of the first circumferential member is configured to form a first seal with a seal member and the second seal surface of the second circumferential member is configured to form a second seal with the seal member when the end portion of the second circumferential member is disposed in the recess of the first circumferential member These and other features of the present disclosure will become more apparent from the following description of the illustrative embodiments.

DETAILED DESCRIPTION OF THE DRAWINGS

Figure 1:
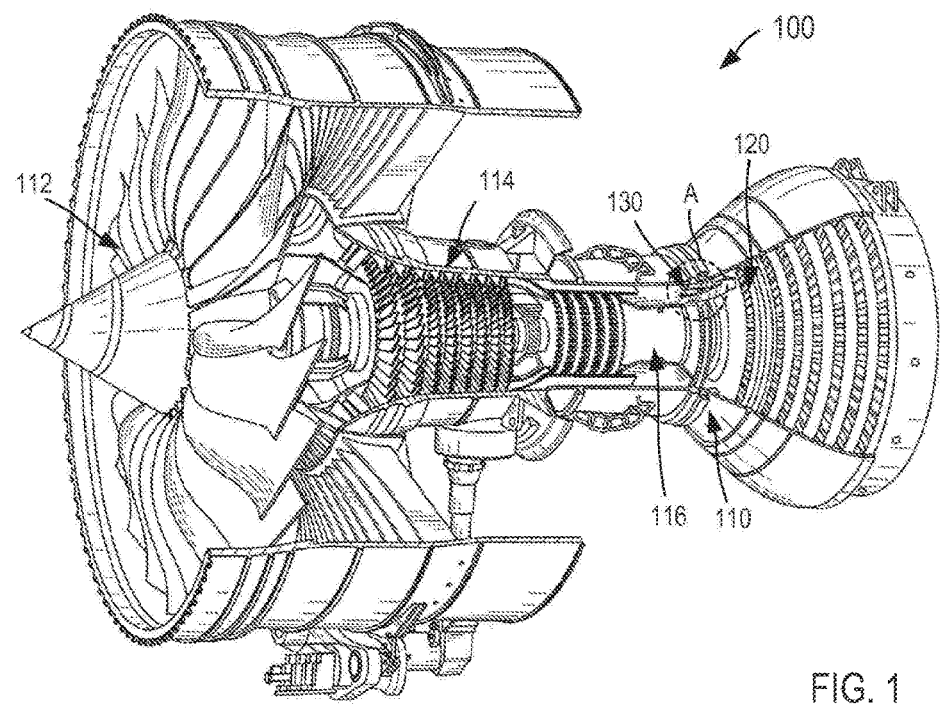
FIG. 1 is a cut-away perspective of a gas turbine engine and its various components according to an embodiment.

For the purposes of promoting an understanding of the principles of the disclosure, reference will now be made to a number of illustrative embodiments shown in the drawings and specific language will be used to describe the same.

Apparatuses, methods, and systems related sealing components within a gas turbine engine are disclosed herein. In some embodiments, the blade track assemblies described herein and/or any portion thereof may be used in a turbine engine (e.g., a jet engine). A jet engine, as described in further detail herein, includes various components, which can form distinct portions of the engine. For example, in some embodiments, a jet engine can include an air intake portion, compressor portion, a combustion portion, a turbine portion, and an exhaust portion. The embodiments and methods described herein can be used, for example, in such turbine portions and/or in such compressor portions. Moreover, although described herein in the context of turbine blade track assemblies, the embodiments described herein can be used in conjunction with any suitable components of a gas turbine engine or other suitable fluid machinery.

In some embodiments, an apparatus includes a first circumferential member and a second circumferential member. The first circumferential member includes an end portion that defines a recess and includes a first seal surface. The second circumferential member includes an end portion that includes a second seal surface. The end portion of the second circumferential member is configured to be at least partially disposed in the recess of the first circumferential member to collectively form at least a portion of a circumferential assembly of a gas turbine. The first seal surface of the first circumferential member is configured to form a first seal with a seal member and the second seal surface of the second circumferential member is configured to form a second seal with the seal member when the end portion of the second circumferential member is disposed in the recess of the first circumferential member.

In some embodiments, an apparatus includes a first circumferential member and a second circumferential member. An end portion of the first circumferential member includes a first seal surface and an end portion of the second circumferential member includes a second seal surface. The end portion of the second circumferential member is configured to be disposed adjacent to the end portion of the first circumferential member such that a line normal to the second seal surface intersects the first seal surface. The first seal surface forms a first seal with a seal member and the second seal surface forms a second seal with the seal member when the end portion of the second circumferential member is disposed adjacent to the end portion of the first circumferential member. The first circumferential member, the second circumferential member, and the seal member collectively form at least a portion of a circumferential assembly of a gas turbine when the seal member forms the first seal and the second seal.

In some embodiments, a method includes disposing a seal member against a seal surface of an end portion of a first circumferential member. An end portion of a second circumferential member is disposed within a recess defined by the first circumferential member such that a seal surface of the second circumferential member is in contact with the seal member. The first circumferential member and the second circumferential form at least a portion of a circumferential assembly of a gas turbine.

As used in this specification, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the value stated. For example, about 0.5 would include 0.45 and 0.55, about 10 would include 9 to 11, about 1000 would include 900 to 1100. Such variances can result from manufacturing tolerances, measurement tolerances, tolerance stacking, and/or other practical considerations (such as, for example, a force exerted on and/or otherwise experienced by a structure). For example, a variance may result from a manufacturing tolerance associated with a given manufacturing process. In such instances, particularly when dealing with very small measurements and/or values (e.g., fractions of an inch), manufacturing tolerances may be plus or minus less than 1%, 2%, 3%, 4%, 5%, 6%, 7%, 8%, 9%, 10%, or more of the stated value.

As used herein, the term "set" can refer to multiple features or a singular feature with multiple parts. For example, when referring to a set of walls, the set of walls can be considered as one wall with multiple portions, or the set of walls can be considered as multiple, distinct walls. Thus, a monolithically constructed item can include a set of walls. Such a set of walls may include multiple portions that are either continuous or discontinuous from each other. A set of walls can also be fabricated from multiple items that are produced separately and are later joined together (e.g., via a weld, an adhesive, or any suitable method).

As used herein, the term "axial direction" refers to, for example, the direction along and/or parallel to an axis of rotation of a component configured to rotate. For example, a disk included in a turbine disk assembly is rotatably movable within the turbine portion of an engine about an axis of rotation generally associated with a center of the disk. Thus, the axial direction refers to a direction parallel to and/or otherwise along the axis of rotation.

As used herein, the terms "tangential direction" or "circumferential direction" can be used interchangeably to refer to, for example, a direction of rotation of a component configured to rotate. For example, the disk included in the turbine disk assembly (described above) is rotatably movable within the turbine portion in a clockwise and/or counterclockwise direction. Thus, a fixed point on the circumference of the disk (i.e., that is tangent to the circumference of the disk) circumscribes the circumference of the disk when rotated 360° about the axis of rotation. Thus, the tangential direction or circumferential direction refers to the direction of rotation.

As used herein, the term "radial direction" refers to, for example, the direction along a radius of a component from a center of the component to an outer surface associated with the circumference or perimeter of the component (or vice versa). For example, the disk included in the turbine disk assembly (described above) includes an outer surface associated with its circumference. Therefore, a radial line extends between the axis of rotation (i.e., the centerline of the disk) and a point along the outer surface (i.e., the surface defining the circumference of the disk). Thus, the radial direction refers to a direction parallel to and/or otherwise along the radial line.

FIG. 1 shows a gas turbine engine 100 with a portion cut-away to show that the engine 100 includes a fan 112, a compressor 114, a combustor 116, and a turbine 120, each of which are at least partially disposed in and/or connected to a case 110. In use, the fan 112 is driven by the turbine 120 to provide thrust. The compressor 114 compresses and delivers air to the combustor 116. The combustor 116 mixes fuel with the compressed air received from the compressor 114 and ignites the fuel to produce hot, high-pressure gas. The resulting flow of hot, high-pressure gas is directed from the combustor 116 into the turbine 120, within which the hot, high pressure gas produces work by rotating portions of the turbine 120, which in turn, drives the compressor 114 and the fan 112.

More specifically, the turbine 120 includes a static vane assembly 121 and a turbine wheel assembly 125. The turbine wheel assembly 125 includes a series of disks each of which includes a blade 126 extending from the disk. The static vane assembly 121 extends across the flow path of the hot, high-pressure gas from the combustor 116, and directs the gas toward the blades 126 included in the turbine wheel assembly 125. In response, the blades 126 are pushed by the combustion products to cause the turbine wheel assembly 125 to rotate, thereby driving the rotating components of the compressor 114 and the fan 112.

Figure 2:
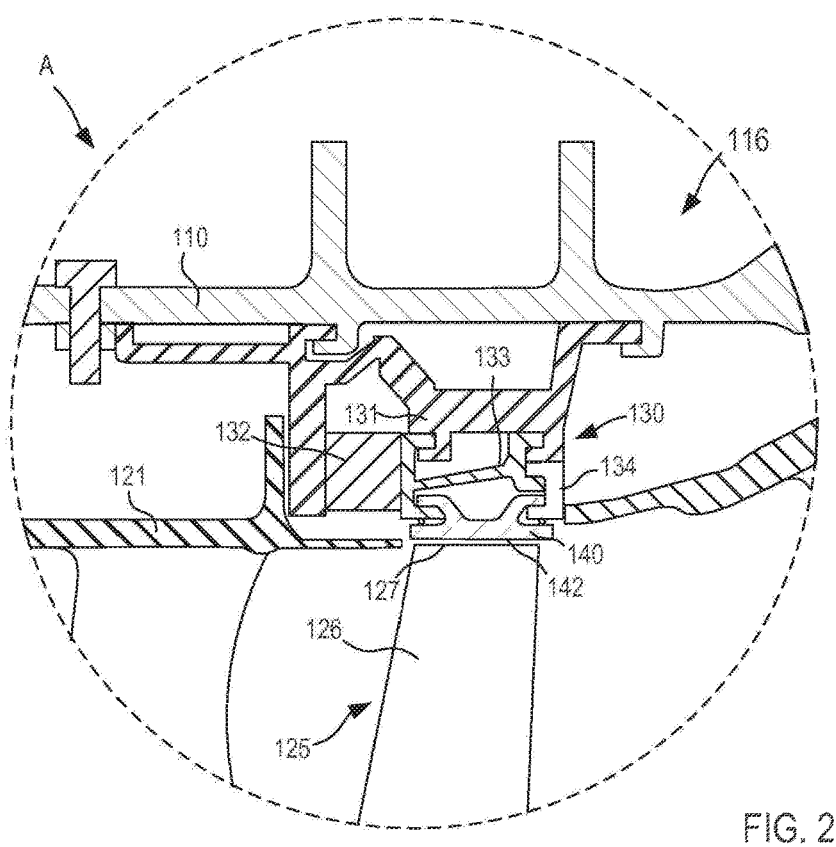
FIG. 2 is an enlarged cross-sectional view of a portion of a turbine included in the gas turbine engine of FIG. 1, identified as region A.

As shown in FIG. 2, the turbine 120 includes a turbine shroud assembly 130 having a set of carriers 131 and a set of blade tracks 140 that collectively extend circumferentially around the turbine wheel assembly 125. FIG. 2 shows a cross-sectional view of one carrier 131 and one blade track assembly 140, but the shroud assembly 130 includes a set of carriers 131 and a set of blade tracks 140 that surround the wheel assembly 125 to block combustion products from passing over the tips 127 of the blades 126 included in the turbine wheel assembly 125 (a single blade 126 is shown in FIG. 2) without acting on the blades 126 to cause rotation of the wheel assembly 125. In some embodiments, the turbine shroud assembly 130 and/or the blade tracks 140 can be adjustable to control the amount of blade tip clearance between the blade tips 127 and an inner surface 142 of each blade track 140. Thus, the amount of hot, high-pressure gas that passes over the blade tips 127 without pushing the blades 126 can be managed as the turbine wheel assembly 125 expands and contracts during operation of the gas turbine engine 100. Thus, as shown, the shroud assembly 130 and/or the blade tracks 140 (or blade track assembly) include a series of segments that surround (or extend circumferentially around) the turbine wheel assembly 125.

In particular, the set of carriers 131 (a single carrier 131 is shown in FIG. 2) of the turbine shroud 130 can be any suitable shape, size, and/or configuration. For example, in some embodiments, each carrier 131 can be at least a semi-annular metallic ring that is coupled to a portion of the each blade track 140. Each carrier 131 is configured to couple, at least indirectly, to the case 110 of the gas turbine engine 100 and configured to suspend at least one blade track 140 from the blade track assembly in a position adjacent to the blades 126 of the turbine wheel assembly 125. For example, the turbine shroud assembly 130 can include a retainer ring 132, a spar 133, and a set of retention clips 134 that can collectively couple the blade track 140 to the carrier 131. Thus, with each carrier 131 coupled, at least indirectly, to the case 110, each blade tack 140 can be suspended to collectively form a circumferential blade track disposed adjacent to the blade tips 127.

In some embodiments, the turbine shroud assembly 130 can include a similar number of carriers 131 and blade tracks 140, with each carrier 131 suspending a single blade track 140. In other embodiments, a carrier 131 can be configured to suspend a number of blade tracks 140. In still other embodiments, the turbine shroud 130 can include a single carrier configured to support each blade track 140. In some embodiments, the blade track 140 can be movable relative to the carrier 131 from a radially inward position, in which the set of blade tracks 140 collectively define a relatively small diameter, to a radially outward position, in which the set of blade tracks 140 collectively define a relatively large diameter.

Although the blade track 140 in FIG. 2 is shown as having a specific cross-sectional shape, each blade track 140 (also referred to herein as "circumferential members") can be any suitable shape, size, and/or configuration. Moreover, the blade tracks 140 can be constructed from any suitable material. For example, in some embodiments, the blade tracks 140 can each be formed from a ceramic material and more particularly, a ceramic matrix composite (CMC). For purposes of this application, a ceramic material can be any monolithic ceramic or composite in which at least one constituent is a ceramic (e.g., silicon carbide or the like). Ceramics are often well suited for applications in which a material will be exposed to very high heat. CMCs are arranged by embedding ceramic fibers in a ceramic matrix, which in some instances can overcome deficiencies that may otherwise be associated with the constituent ceramic base material. In some embodiments, the CMC material can include, for example, silicon carbide fibers and/or a silicon carbide matrix (SiC—SiC CMC material), oxide-oxide (Ox-Ox CMC material), a monolithic ceramic, and/or the like. In other embodiments, the blade tracks 140 can be formed from any suitable metallic, alloy, non-metallic, and/or composite material such as, for example, dense chopped fiber reinforced silicon carbide, monolithic silicon nitride based materials, monolithic aluminum oxide, whisker reinforced aluminum oxide, nickel alloy, cobalt alloy, and/or Mn+1AXn (MAX) phase materials (e.g., Ti3SIC2, Ti2AlC, etc.).

The shroud assembly 130 can include any suitable number of blade tracks 140 or blade track segments 140 joined together to collectively form a substantially annular blade track assembly. For example, in some embodiments, a blade track assembly can include at least ten blade tracks 140 that are joined together to surround the wheel assembly 125. In other embodiments, a blade track assembly can include up to thirty-six blade tracks 140. In still other embodiments, a blade track assembly can include less than ten blade tracks 140, more than thirty-six blade tracks 140, and/or any suitable number therebetween.

Although not shown in FIGS. 1 and 2, in some instances, seal members (e.g., strip seals and/or the like) can be disposed between adjacent blade tracks 140, which can reduce and/or substantially eliminate any leak path between such adjacent components. In some embodiments, the blade tracks 140 can be altered, cut, notched, slotted, and/or otherwise modified to accept and/or couple to such seal members.

Figure 3:
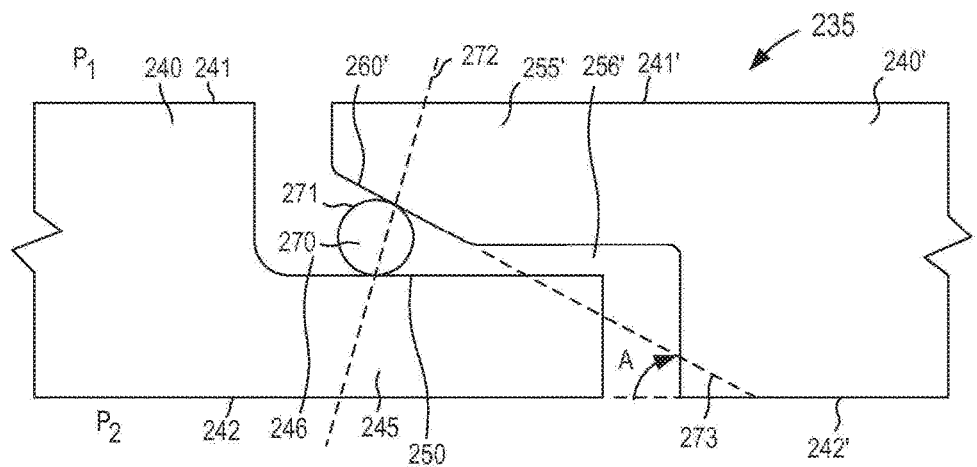
FIG. 3 is a schematic side view illustration of a portion of a blade track assembly according to an embodiment.

In other embodiments, adjacent blade tracks, carriers and/or any other adjoining portions of a shroud assembly can be configured to selectively engage a seal member disposed therebetween in any suitable manner. For example, FIG. 3 is a schematic illustration of a portion of a shroud assembly 235 according to an embodiment. The portion of the shroud assembly 235 can be, for example, a portion of the shroud assembly 130 described above with reference to FIGS. 1 and 2. Thus, the portion of the shroud assembly 235 can be used in a turbine and/or compressor of a gas turbine engine such as the gas turbine engine 100 shown in FIG. 1. More specifically, in some embodiments, the portion of the shroud assembly 235 can be included in a shroud configured to surround a turbine wheel assembly of a turbine to limit, reduce, and/or otherwise minimize a flow of combustion products (e.g., from a combustor upstream of the turbine) outside of an area associated with the turbine wheel assembly, as described in detail above with reference to FIGS. 1 and 2.

As shown in FIG. 3, the portion of the shroud assembly 235 (also referred to herein as a "circumferential assembly")

includes a first blade track 240, a second blade track 240', and a seal member 270. The first blade track 240 (also referred to herein as a "first circumferential member") can be any suitable shape, size, and/or configuration. For example, in some embodiments, the first blade track 240 can be substantially similar to the blade track 140 described above with reference to FIG. 2. In some embodiments, the first blade track 240 can be formed from a CMC material such as those described above with reference to the blade track 140. The first blade track 240 (only a portion of which is shown in FIG. 3) has a first surface 241 and a second surface 242 and includes an end portion 245. The first surface 241 (e.g., an "outer surface") defines a recess 246 at or near the end portion 245. The first surface 241 and the second surface 242 can correspond to either an "outer" surface of an assembly or an "inner" surface (e.g., similar to the inner surface 142 of the blade track 140). Similarly stated, although the first surface 241 may be described as being an "outer surface," it can also be an inner surface. At least a portion of the recess 246 includes and/or forms a first sealing surface 250, as described in further detail herein.

The second blade track 240' (also referred to herein as a "second circumferential member") can be any suitable shape, size, and/or configuration. For example, in some embodiments, the second blade track 240' can be substantially similar to the blade track 140 described above with reference to FIG. 2. As described above, the second blade track 240' can be formed from a CMC material such as those described herein. The second blade track 240' (only a portion of which is shown in FIG. 3) has a first surface 241' and a second surface 242' and includes an end portion 255'. The first surface 241' defines a recess 256' at or near the end portion 255'. The end portion 255' includes and/or forms a second sealing surface 260'. As shown in FIG. 3, the end portion 255' of the second blade track 240' can be arranged such that a line 273 parallel to the second sealing surface 260' forms an angle A with the first surface 241' of the second circumferential member 240', as described in further detail herein.

In some embodiments, the second blade track 240' can be similar to or substantially the same as the first blade track 240. For example, the end portion 245 of the first blade track 240 can be a first end portion of the first blade track 240. Although not shown in FIG. 3, the first blade track 240 can include a second end portion opposite the first end portion (i.e., the end portion 245), which is similar to or substantially the same as the end portion 255' of the second blade track 240'. Accordingly, the end portion 255' of the second blade track 240' can be a second end portion of the second blade track 240' and, although not shown in FIG. 3, the second blade track 240' can include a first end portion opposite the second end portion (i.e., the end portion 255', which is similar to or substantially the same as the end portion 245 of the first blade track 240. In this manner, a series of blade tracks 240 (or 240') can be assembled end-to-end to form an annular ring.

As shown in FIG. 3, the end portion 255' of the second blade track 240' can be at least partially disposed in the recess 246 defined by the first blade track 240. Similarly, the end portion 245 of the first blade track 240 can be at least partially disposed in the recess 256' of the second blade track 240'. Said another way, the arrangement of the portion of the shroud assembly 235 is such that the end portion 255' of the second blade track 240' at least partially overlaps the end portion 245 of the first blade track 240, thereby forming and/or defining a lap joint or the like. Moreover, with the first blade track 240 and the second blade track 240' being substantially similar (as described above), a radius of curvature associated with the first surface 241 of the first blade track 240 and a radius of curvature associated with the second surface 242 of the first blade track 240 can be substantially aligned with and/or equal to a radius of curvature associated with the first surface 241' of the second blade track 240' and a radius of curvature associated with the second surface 242' of the second blade track 240', respectively. That is to say, the end portion 245 of the first blade track 240 and the end portion 255' of the second blade track 240' can form, for example, a lap joint or the like such that the portion of the shroud assembly 235 has a substantially consistent radius of curvature associated with each of an outer surface and an inner surface of the portion of the shroud assembly 235 (the "bend" or radius of curvature of the components is not shown in FIG. 3).

The seal member 270 included in the portion of the shroud assembly 235 can be any suitable shape, size, and/or configuration. For example, as shown in FIG. 3, the seal member 270 can have an outer surface 271 that has and/or that defines substantially circular cross-sectional shape. Moreover, the seal member 270 can be, for example, substantially cylindrical. In some embodiments, the seal member 270 can be formed from a CMC material such as those described above. In other embodiments, the seal member 270 can be formed from a metal, a metal alloy, a ceramic, a composite, and/or any other suitable material with a melting point that is sufficiently high to withstand exposure to temperatures associated with the operation of a gas turbine engine or the like.

As shown in FIG. 3, the seal member 270 is configured to be disposed between the end portion 245 of the first blade track 240 and the end portion 255' of the second blade track 240'. More specifically, a first portion of the outer surface 271 of the seal member 270 can be placed in contact with the first seal surface 250 of the first blade track 240 and a second portion of the outer surface 271 of the seal member 270 can be placed in contact with the second seal surface 260' of the second blade track 240'. Thus, the seal member 270 can form a first seal with the first seal surface 250 and can form a second seal with the second seal surface 260', thereby defining a sealing plane 272 (or line, as shown in the cross-sectional view of FIG. 3) therebetween. Similarly stated, the plane and/or line 272 normal to the first seal surface 250 intersects the second seal surface 260'. As a result, the seal member 270 can contact that first seal surface 250 and the second seal surface 260' to substantially fluidically isolate a volume on a first side of the sealing plane 272 (i.e., the volume outside of the assembly) from a volume on a second side of the sealing plane 272, opposite the first side (i.e., the volume inside of the assembly).

When in use, the arrangement of the portion of the shroud assembly 235 can limit, reduce, and/or otherwise minimize a flow of combustion product around or outside of an area associated with a turbine wheel assembly while maintaining the ability of the components to move relative to each other. Specifically, as described above with reference to FIGS. 1 and 2, the first blade track 240 and the second blade track 240' can be movable relative to, for example, a carrier (e.g., the carrier 131) and/or relative to each other in response to a change in operating conditions of, for example, a turbine. As such, a clearance between a tip of a blade included in a turbine wheel assembly and the first (or outer) surfaces 241 and/or 241' can be reduced and/or minimized. For example, in some embodiments, the clearance between the outer surface 241 of the first blade track 240 and/or the outer surface 241' of the second blade track 240' at non-operating temperatures (e.g., substantially ambient temperature) and/or "cold" temperatures can be between about 0.060" and about 0.080". Conversely, the first blade track 240 and the second blade track 240' can be configured to move during operation (e.g., in response to a thermal expansion of an actuator or other component in the shroud assembly) such that, at or near operating temperatures (e.g., greater than about 2100 degrees Fahrenheit (° F.)), the clearance can be about 0.010". Moreover, while the seal member 270 is described above as forming the first seal and the second seal, the seal member 270 can be configured to dampen a relative movement between the end portion 245 of the first blade track 240 and the end portion 255' of the second blade track 240'. For example, during operation, the second blade track 240' can move relative to the first blade track 240 in response to an operating condition (e.g., temperature or the like). As such, a space defined between the end portions 245 and 255' is changed in response to the relative movement. Thus, in some instances, with the seal member 270 disposed between the first seal surface 250 and the second seal surface 260', the seal member can absorb, reduce, limit, and/or otherwise dampen a force associated with a change in the space between the end portions 240 and 250', which in turn, can reduce an amount of stress and/or fatigue experienced by or within the end portions 240 and 250'.

Furthermore, the arrangement of the lap joint formed by the end portion 240 of the first blade track 240 and the end portion 255' of the second blade track 240' and the arrangement of the seal member 270 therebetween fluidically isolates the first (or outer) surfaces 241 and 241' from the second (or inner) surfaces 242 and 242', respectively. More specifically, the end portions 245 and 255' of the first blade track 240 and the second blade track 240' define a tortuous flow path therebetween, which in turn, can reduce and/or limit a flow of combustion products therein. In addition, the first seal defined by the outer surface 271 of the seal member 270 in contact with the first sealing surface 250 and the second seal defined by the outer surface 271 of the seal member 270 in contact with the second sealing surface 260, fluidically isolates a portion of the tortuous flow path disposed on a first side of the sealing plane 272 from a portion of the tortuous flow path disposed on a second side of the sealing plane 272, opposite the first side. Thus, combustion products are substantially prevented from flowing from a volume in fluid communication with the outer surfaces 241 and 241' of the blade tracks 240 and 240', respectively, through the tortuous flow path defined by the lap joint, and into a volume in volume in fluid communication with the inner surfaces 242 and 242' of the blade tracks 240 and 240', respectively.

In those embodiments in which the assembly 235 is a portion of a turbine shroud, during operation of the turbine within which the portion of the shroud assembly 235 is disposed, a pressure P1 on the first (or outer) surfaces 241 and 241' of the first blade track 240 and the second blade track 240', respectively, is greater than a pressure P2 on the second (or inner) surfaces 242 and 242' of the first blade track 240 and the second blade track 240', respectively. Because the second sealing surface 260' is tapered (or at the acute angle A relative to the first surface 242' of the second blade track 240'), the higher pressure P1 exerts a force on the seal member 270 that is sufficient to maintain substantially constant contact between the outer surface 271 of the seal member 270 and the sealing surfaces 250 and 260' even during relative movement between the first blade track 240 and the second blade track 240'. Moreover, the angle A can be such that contact between the second sealing surface 260' and the outer surface 271 of the seal member 270 form the second seal substantially without binding the seal member 270 and/or the second blade track 240' relative to each other and/or the first blade track 240. Said another way, the angle A can be such that the first seal and the second seal can be maintained substantially without hindering the relative movement between first blade track 240 and the second blade track 240'. In some embodiments, the seal member 270 and/or the sealing surfaces 250 and 260' can include a coating or the like to facilitate the formation and/or maintenance of the first seal and the second seal. Such coatings can include, for example, petroleum jelly, an adhesive, and/or the like (applied during assembly), as well as yttrium disilicate, Barium-Strontium-Alumino-Silicate (BSAS), transition metal silicates (e.g. HfSiO4, ZrSiO4, etc.), rare earth silicates (e.g. Y2Si2O7, Y2SiO5, Yb2Si2O7, Yb2SiO5, etc.), an alkaline or mixed alkaline aluminosilicate (e.g. Ba0.5Sr0.5Al2Si2O8, BaAl2Si2O8, etc.), mullite (Al6Si2O13), and/or the like, or mixtures thereof.

Figure 4:
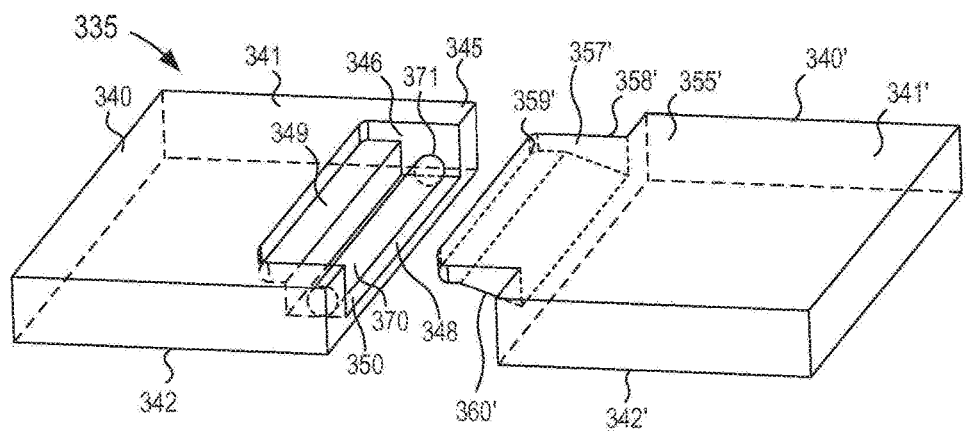
FIG. 4 is a perspective view of a portion of a blade track assembly according to an embodiment.
Figure 5:
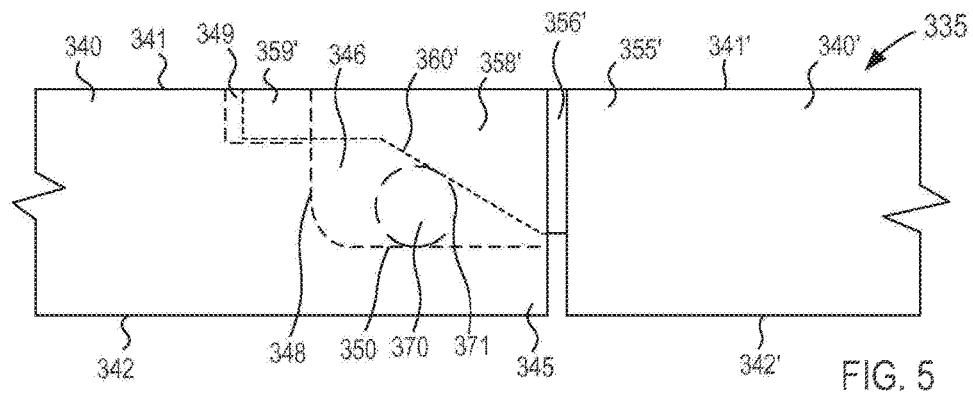
FIG. 5 is a side view of the portion of the blade track assembly of FIG. 4.

FIGS. 4 and 5 are schematic illustrations of a portion of a shroud assembly 335 according to an embodiment. The portion of the shroud assembly 335 can be, for example, a portion of the shroud assembly 130 described above with reference to FIGS. 1 and 2. Thus, the portion of the shroud assembly 335 can be used in a turbine and/or compressor of a gas turbine engine such as the gas turbine engine 100 shown in FIG. 1. More specifically, in some embodiments, the portion of the shroud assembly 335 can be included in a shroud configured to surround a turbine wheel assembly of a turbine to limit, reduce, and/or otherwise minimize a flow of combustion products (e.g., from a combustor upstream of the turbine) outside of an area associated with the turbine wheel assembly, as described in detail above with reference to FIGS. 1 and 2. In some embodiments, the portion of the shroud assembly 335 can be at least partially similar in form and/or function to the portion of the shroud assembly 235 described above with reference to FIG. 3. Thus, some aspects of the portion of the shroud assembly 335 and/or the corresponding functions thereof are not described in further detail herein.

As shown in FIGS. 4 and 5, the portion of the shroud assembly 335 (also referred to herein as a "circumferential assembly") includes a first blade track 340, a second blade track 340', and a seal member 370. The first blade track 340 (also referred to herein as a "first circumferential member") can be any suitable shape, size, and/or configuration. For example, in some embodiments, the first blade track 340 can be substantially similar to the blade track 140 described above with reference to FIG. 2 and can be formed from a CMC material such as those described herein. The first blade track 340 (only a portion of which is shown in FIGS. 4 and 5) has an outer surface 341 and an inner surface 342 and includes an end portion 345. The outer surface 341 defines a recess 346 at or near the end portion 345. The recess 346 includes a first portion 348 and a second portion 349. The first portion 348 of the recess 346 includes and/or forms a first sealing surface 350, as described in detail above with reference to the first blade track 240 in FIG. 3. As shown in FIG. 4, the arrangement of the end portion 345 of the first blade track 340 is such that the recess 346 does not extend through the entire width of the first blade track 340, which in turn, can facilitate the retention of the seal member 370 in the first portion 348 of the recess 346. As shown in FIG. 5, the second portion 349 of the recess 346 is configured to receive a portion of the second blade track 340', as described in further detail herein.

The second blade track 340' (also referred to herein as a "second circumferential member") can be any suitable shape, size, and/or configuration. For example, in some embodiments, the second blade track 340' can be substantially similar to the blade track 140 described above with reference to FIG. 2 and be formed from a CMC material such as those described herein. Moreover, although only a portion of the first blade track 340 and the second blade track 340' are shown in FIGS. 4 and 5, the second blade track 340' can be similar to or substantially the same as the first blade track 340, as described above with reference to the portion of the shroud assembly 235.

The second blade track 340' (only a portion of which is shown in FIGS. 4 and 5) has an outer surface 341' and an inner surface 342' and includes an end portion 355'. The second blade track 340' further includes a protrusion 357' extending from the end portion 355'. The protrusion 357' includes a first portion 358' and a second portion 359'. The first portion 358' of the protrusion 357' includes and/or forms a second sealing surface 360'. As described above with reference to the second sealing surface 260' in FIG. 3, the second sealing surface 360' can be arranged and/or otherwise disposed at an angle relative to the outer surface 341' and/or the inner surface 342' of the second blade track 340'. The second portion 359' of the protrusion 357' is configured to be disposed and/or aligned with the second portion 349 of the recess 346 defined by the first blade track 340, as described in further detail herein. As shown in FIG. 5, the end portion 355' of the second blade track 340' can be at least partially disposed in the recess 346 defined by the first blade track 340. More specifically, the first portion 358' of the protrusion 357' extending from the second blade track 340' is disposed in and/or substantially aligned with the first portion 348 of the recess 346 defined by the first blade track 340 and the second portion 359' of the protrusion 357' is disposed in and/or substantially aligned with the second portion 349 of the recess 346 defined by the first blade track 340. Thus, the end portion 355' of the second blade track 340' at least partially overlaps the end portion 345 of the first blade track 340 to form and/or define a lap joint or the like.

The seal member 370 included in the portion of the shroud assembly 335 can be any suitable shape, size, and/or configuration. For example, as shown in FIG. 3, the seal member 370 can have an outer surface 371 that has and/or that defines substantially circular cross-sectional shape. Moreover, the seal member 370 can be, for example, substantially cylindrical. In some embodiments, the seal member 370 can be formed from a CMC material such as those described above. In other embodiments, the seal member 370 can be formed from a metal, a metal alloy, a ceramic, a composite, and/or any other suitable material with a melting point that is sufficiently high to withstand exposure to temperatures associated with the operation of a gas turbine engine or the like. In some embodiments, the seal member 370 can be similar to and/or substantially the same as the seal member 270 described above with reference to FIG. 3. Thus, aspects of the seal member 370 and/or the corresponding functions thereof are not described in further detail herein.

As shown in FIG. 5, the seal member 370 is configured to be disposed between the end portion 345 of the first blade track 340 and the end portion 355' of the second blade track 340'. More specifically, a first portion of the outer surface 371 of the seal member 370 can be placed in contact with the first seal surface 350 of the first blade track 340 and a second portion of the outer surface 371 of the seal member 370 can be placed in contact with the second seal surface 360' of the second blade track 340'. Thus, the seal member 370 can form a first seal with the first seal surface 350 and can form a second seal with the second seal surface 360' to substantially fluidically isolate a volume on a first side of the seal member 370 from a volume on a second side of the seal member 370, opposite the first side.

When in use, the arrangement of the portion of the shroud assembly 335 can limit, reduce, and/or otherwise minimize a flow of combustion product around or outside of an area associated with a turbine wheel assembly. Specifically, as described above with reference to FIGS. 1 and 2, the first blade track 340 and the second blade track 340' can be movable relative to, for example, a carrier (e.g., the carrier 131) or the like and/or relative to each other in response to a change in operating conditions of, for example, a turbine. As such, a clearance between a tip of a blade included in a turbine wheel assembly and the outer surfaces 341 and/or 341' can be reduced and/or minimized. Furthermore, the arrangement of the lap joint formed by the end portion 345 of the first blade track 340 and the end portion 355' of the second blade track 340' and the arrangement of the seal member 370 therebetween fluidically isolates the outer surfaces 341 and 341' from the inner surfaces 342 and 342', respectively, as described in detail above with reference to the portion of the shroud assembly 235 in FIG. 3. Thus, combustion products are substantially prevented from flowing from a volume in fluid communication with the outer surfaces 341 and 341' of the blade tracks 340 and 340', respectively, through the tortuous flow path defined by the lap joint, and into a volume in volume in fluid communication with the inner surfaces 342 and 342' of the blade tracks 340 and 340', respectively.

The arrangement of the second portion 359' of the protrusion 357' extending from the second blade track 340' disposed in the second portion 349 of the recess 346 defined by the first blade track 340 can close and/or otherwise block an outer opening of the lap joint through which the seal member 370 might otherwise move through during operation. In addition, this arrangement can facilitate the alignment of the second blade track 340' with the first blade track 340, which can reduce time and/or cost associated with assembly.

Figure 6:
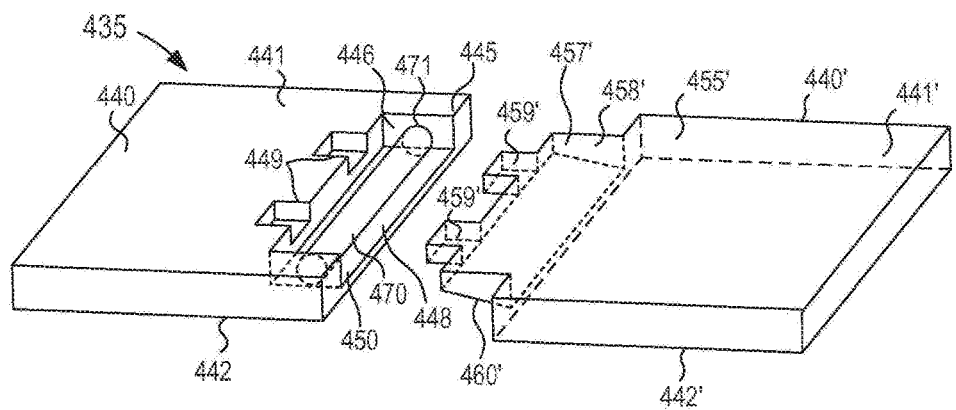
FIGS. 6-9 are each perspective views of a portion of various blade track assemblies, according to various embodiments.

FIG. 6 is a schematic illustration of a portion of a shroud assembly 435 according to an embodiment. The portion of the shroud assembly 435 can be, for example, a portion of the shroud assembly 130 described above with reference to FIGS. 1 and 2, or any other assembly described herein. Thus, the portion of the shroud assembly 435 can be used in a turbine and/or compressor of a gas turbine engine such as the gas turbine engine 100 shown in FIG. 1. More specifically, in some embodiments, the portion of the shroud assembly 435 can be included in a shroud configured to surround a turbine wheel assembly of a turbine to limit, reduce, and/or otherwise minimize a flow of combustion products (e.g., from a combustor upstream of the turbine) outside of an area associated with the turbine wheel assembly, as described in detail above with reference to FIGS. 1 and 2. In some embodiments, the portion of the shroud assembly 435 can be at least partially similar in form and/or function to the portion of the shroud assembly 335 described above with reference to FIGS. 4 and 5. Thus, some aspects of the portion of the shroud assembly 435 and/or the corresponding functions thereof are not described in further detail herein.

As shown in FIG. 6, the portion of the shroud assembly 435 (also referred to herein as a "circumferential assembly") includes a first blade track 440, a second blade track 440', and a seal member 470. The first blade track 440 (also referred to herein as a "first circumferential member") can be any suitable shape, size, and/or configuration. For example, in some embodiments, the first blade track 440 can be substantially similar to the blade track 340 described above with reference to FIGS. 4 and 5. For example, the first blade track 440 includes an end portion 445 that defines a recess 446 having a first portion 448 and a second portion 449. The first portion 448 includes and/or forms a first sealing surface 450, as described in detail above with reference to the first blade track 340 in FIGS. 4 and 5. The first blade track 440 can differ from the first blade track 340 in FIGS. 4 and 5, in the arrangement of the second portion 449 of the recess 446. For example, as shown in FIG. 6, the second portion 449 of the recess 446 includes, forms, and/or defines two recesses or cut-out each of which is configured to receive a different portion of the second blade track 440', as described in further detail herein.

The second blade track 440' (also referred to herein as a "second circumferential member") can be any suitable shape, size, and/or configuration. For example, in some embodiments, the second blade track 440' can be substantially similar to the blade track 340 described above with reference to FIGS. 4 and 5. Moreover, although only a portion of the first blade track 440 and the second blade track 440' are shown in FIG. 6, the second blade track 440' can be similar to or substantially the same as the second blade track 240', as described above with reference to the portion of the shroud assembly 235. The second blade track 440' (only a portion of which is shown in FIG. 6) has end portion 455', which includes a protrusion 457' extending therefrom. The protrusion 457' includes a first portion 458' and a second portion 459'. The first portion 458' of the protrusion 457' includes and/or forms a second sealing surface 460', as described above with reference to the second blade track 340' in FIGS. 4 and 5. The second portion 459' of the protrusion 457' includes two tabs, each of which is configured to be disposed in and/or aligned with one of the recesses or cutouts of the second portion 449 of the recess 446 defined by the first blade track 440, as described in further detail herein. As shown in FIG. 6, the end portion 455' of the second blade track 440' can be at least partially disposed in the recess 446 defined by the first blade track 440. More specifically, the first portion 458' of the protrusion 457' extending from the second blade track 440' is disposed in and/or substantially aligned with the first portion 448 of the recess 446 defined by the first blade track 440 and the tabs of the second portion 459' of the protrusion 457' are each disposed in and/or substantially aligned with the corresponding second portion 449 of the recess 446 defined by the first blade track 440. Thus, the end portion 455' of the second blade track 440' at least partially overlaps the end portion 445 of the first blade track 440 to form and/or define a lap joint or the like.

The seal member 470 included in the portion of the shroud assembly 435 can be any suitable shape, size, and/or configuration. For example, as shown in FIG. 3, the seal member 470 can have an outer surface 471 that has and/or that defines substantially circular cross-sectional shape. Moreover, the seal member 470 can be, for example, substantially cylindrical. In some embodiments, the seal member 470 can be similar to and/or substantially the same as the seal member 270 described above with reference to FIG. 3, or any other seal members described herein. Thus, aspects of the seal member 470 and/or the corresponding functions thereof are not described in further detail herein. As shown in FIG. 6, the seal member 470 is configured to be disposed between the end portion 445 of the first blade track 440 and the end portion 455' of the second blade track 440' and in contact with the first seal surface 450, to define a first seal, and the second seal surface 460', to define a second seal, as described in detail above with reference to the seal member 270 in FIG. 3. Thus, the seal member 470 can substantially fluidically isolate a volume on a first side of the seal member 470 from a volume on a second side of the seal member 470, opposite the first side.

When in use, the arrangement of the portion of the shroud assembly 435 can limit, reduce, and/or otherwise minimize a flow of combustion product around or outside of an area associated with a turbine wheel assembly, as described above with reference to FIGS. 1 and 2. The arrangement of the lap joint formed by the end portion 445 of the first blade track 440 and the end portion 455' of the second blade track 440', and the arrangement of the seal member 470 therebetween fluidically isolates an outer surface 441 of the first blade track 440 from an inner surface 442 of the first blade track and an outer surface 441' of the second blade track 440' from an inner surface 442', as described in detail above with reference to the portion of the shroud assembly 235 in FIG. 3. Thus, combustion products are substantially prevented from flowing from a volume in fluid communication with the outer surfaces 441 and 441' of the blade tracks 440 and 440', respectively, through the tortuous flow path defined by the lap joint, and into a volume in volume in fluid communication with the inner surfaces 442 and 442' of the blade tracks 440 and 440', respectively. The arrangement of the second portion 459' of the protrusion 457' extending from the second blade track 440' disposed in the second portion 449 of the recess 446 defined by the first blade track 440 can close and/or otherwise block an outer opening of the lap joint through which the seal member 470 might otherwise move through during operation. In addition, this arrangement can facilitate the alignment of the second blade track 440' with the first blade track 440, which can reduce time and/or cost associated with assembly.

Figure 7:
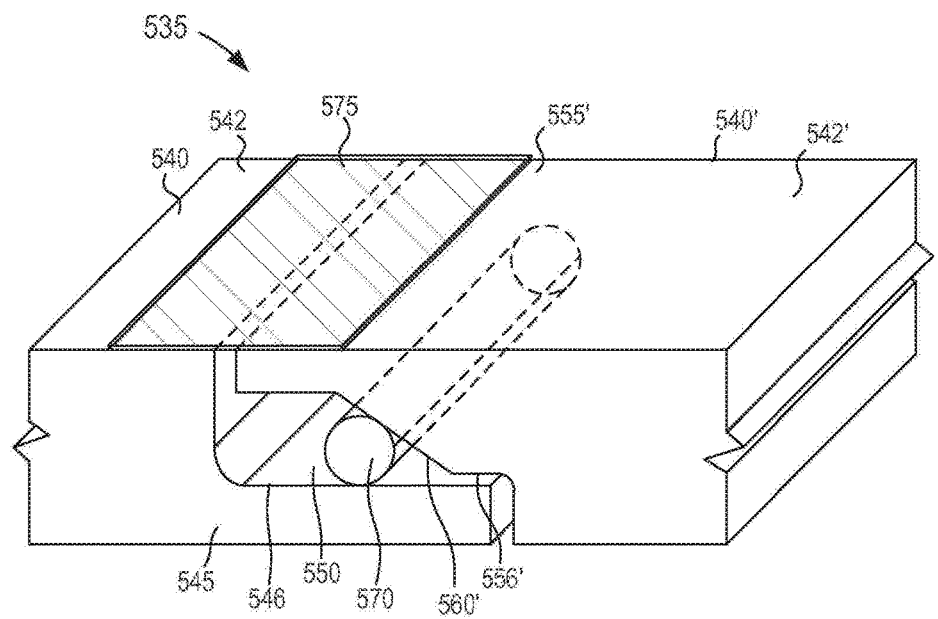

While the portions of the shroud assemblies 235, 335, and 435 are shown and described above as including the seal members 270, 370, and 470, respectively, which each form fluidic seals to obstruct a fluid flow path between the end portions 245 and 255', 345 and 355', and 445 and 455', in other embodiments, a shroud assembly (or a portion thereof) can include one or more additional seal members configured to form a substantially fluid tight seal to obstruct the fluid flow path. For example, FIG. 7 is a schematic illustration of a portion of a shroud assembly 535 according to an embodiment. The portion of the shroud assembly 535 can be, for example, a portion of the shroud assembly 130 described above with reference to FIGS. 1 and 2. Thus, the portion of the shroud assembly 535 can be used in a turbine and/or compressor of a gas turbine engine such as the gas turbine engine 100 shown in FIG. 1. Moreover, the portion of the shroud assembly 535 can be at least partially similar in form and/or function to the portion of the shroud assembly 235 described above with reference to FIG. 3. Thus, some aspects of the portion of the shroud assembly 535 and/or the corresponding functions thereof are not described in further detail herein.

As shown in FIG. 7, the portion of the shroud assembly 535 (also referred to herein as a "circumferential assembly") includes a first blade track 540, a second blade track 540', a seal member 570, and a strip seal 575. The first blade track 540 (also referred to herein as a "first circumferential member") can be any suitable shape, size, and/or configuration. For example, in some embodiments, the first blade track 540 can be substantially similar to the blade track 240 described above with reference to FIG. 3. Thus, the first blade track 540 includes an end portion 545 that defines a recess 546. The recess 546 includes and/or forms a first seal surface 550, as described in detail above with reference to the first blade track 240 in FIG. 3.

The second blade track 540' (also referred to herein as a "second circumferential member") can be any suitable shape, size, and/or configuration. For example, in some embodiments, the second blade track 540' can be substantially similar to the second blade track 240' described above with reference to FIG. 3. Thus, the second blade track 540' has end portion 555', which defines a recess 556'. The recess includes and/or forms a second seal surface 550', as described above with reference to the second blade track 240' in FIG. 3. Moreover, although only a portion of the first blade track 540 and the second blade track 540' are shown in FIG. 6, the second blade track 540' can be similar to or substantially the same as the first blade track 540, as described above with reference to the portion of the shroud assembly 235. As shown in FIG. 7, the end portion 555' of the second blade track 540' can be at least partially disposed in the recess 546 defined by the first blade track 540. Similarly stated, the end portion 555' of the second blade track 540' at least partially overlaps the end portion 545 of the first blade track 540 to form and/or define a lap joint or the like.

The seal member 570 included in the portion of the shroud assembly 535 can be any suitable shape, size, and/or configuration. For example, as shown in FIG. 7, the seal member 570 can have a substantially circular cross-sectional shape. The seal member 570 can be similar to and/or substantially the same as the seal member 270 described above with reference to FIG. 3. Thus, aspects of the seal member 570 and/or the corresponding functions thereof are not described in further detail herein. As shown in FIG. 7, the seal member 570 is configured to be disposed between the end portion 545 of the first blade track 540 and the end portion 555' of the second blade track 540' and in contact with the first seal surface 550, to define a first seal, and the second seal surface 560', to define a second seal, as described in detail above with reference to the seal member 270 in FIG. 3. Thus, the seal member 570 can substantially fluidically isolate a volume on a first side of the seal member 570 from a volume on a second side of the seal member 570, opposite the first side.

The strip seal 575 included in the portion of the shroud assembly 535 can be any suitable shape, size, and/or configuration. For example, in some embodiments, the strip seal 575 can be formed from a relatively thin strip of CMC material, metal, metal alloy, composite, and/or the like. As shown in FIG. 7, in this embodiment, the strip seal 575 can be a substantially planar seal configured to be disposed on an inner surface 542 of the first blade track 540 and an inner surface 542 of the second blade track 540'. More specifically, the strip seal 575 can be disposed on the inner surface 542 of the first blade track 540 at or near its end portion 545 and can be disposed on the inner surface 542' of the second blade track 540' at or near its end portion 555'. Thus, the strip seal 575 can, for example, cover a gap, opening, space, and/or the like that might otherwise be defined between the end portion 545 of the first blade track 540 and the end portion 555' of the second blade track 540'. Thus, the strip seal 575 and the seal member 570 can collectively limit, reduce, inhibit, and/or otherwise substantially prevent a flow of combustion products through a tortuous flow path defined between the end portions 545 and 555' of the first blade track 540 and the second blade track 540', respectively.

Figure 8:
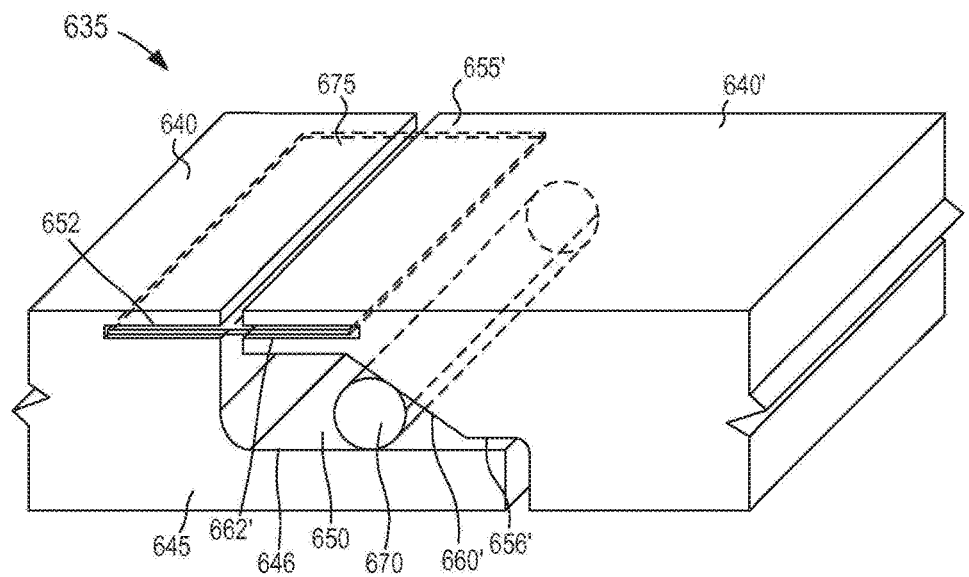

While the portion of the shroud assembly 535 is shown and described above as including the strip seal 575 disposed on the inner surfaces 542 and 542' of the first blade track 540 and the second blade track 540', respectively, in other embodiments, a shroud assembly (or portion thereof) can include a strip seal and a number of blade track in any suitable configuration. For example, FIG. 8 is a schematic illustration of a portion of a shroud assembly 635 according to another embodiment. The portion of the shroud assembly 635 can be, for example, a portion of the shroud assembly 130 described above with reference to FIGS. 1 and 2. Thus, the portion of the shroud assembly 635 can be used in a turbine and/or compressor of a gas turbine engine such as the gas turbine engine 100 shown in FIG. 1. Moreover, the portion of the shroud assembly 635 can be at least partially similar in form and/or function to the portion of the shroud assembly 535 described above with reference to FIG. 7. Thus, some aspects of the portion of the shroud assembly 635 and/or the corresponding functions thereof are not described in further detail herein.

The portion of the shroud assembly 635 (also referred to herein as a "circumferential assembly") includes a first blade track 640, a second blade track 640', a seal member 670, and a strip seal 675. The seal member 670 can be similar to and/or substantially the same as the seal member 270 described above with reference to FIG. 3. The first blade track 640 (also referred to herein as a "first circumferential member") can be any suitable shape, size, and/or configuration. For example, in this embodiment, the first blade track 640 can be substantially similar to the blade track 540 described above with reference to FIG. 7. Thus, the first blade track 640 includes an end portion 645 that defines a recess 646, which in turn, forms a first seal surface 650, as described in detail above with reference to the first blade track 240 in FIG. 3. Similarly, the second blade track 640' (also referred to herein as a "second circumferential member") can be any suitable shape, size, and/or configuration. For example, in this embodiment, the second blade track 640' can be substantially similar to the second blade track 540' described above with reference to FIG. 7. Thus, the second blade track 640' includes an end portion 655' that defines a recess 656', which in turn, forms a second seal surface, as described above with reference to the second blade track 240' in FIG. 3. As shown in FIG. 7, the seal member 670 is configured to be disposed between the end portion 645 of the first blade track 640 and the end portion 655' of the second blade track 640' and in contact with the first seal surface 650, to define a first seal, and the second seal surface 660', to define a second seal, as described in detail above with reference to the seal member 270 in FIG. 3. Thus, the seal member 670 can substantially fluidically isolate a volume on a first side of the seal member 670 from a volume on a second side of the seal member 670, opposite the first side.

While the portion of the shroud assembly 635 is substantially similar to the portion of the shroud assembly 535 in FIG. 7, the portion the shroud assembly 635 can differ from the portion of the shroud assembly 535 is the arrangement of the strip seal 675. For example, as shown in FIG. 8, the first blade track 640 defines a slot 652 configured to receive a portion of the strip seal 675. Similarly, the second blade track 640' defines a slot 662' configured to receive a different portion of the strip seal 675. In this manner, the strip seal 675 can be disposed in the slots 652 and 662' of the first blade track 640 and second blade track 640', respectively, to span and/or cover a gap, opening, space, and/or the like that might otherwise be defined between the end portion 645 of the first blade track 640 and the end portion 655' of the second blade track 640'. Thus, the strip seal 675 and the seal member 670 can collectively limit, reduce, inhibit, and/or otherwise substantially prevent a flow of combustion products through a tortuous flow path defined between the end portions 645 and 655' of the first blade track 640 and the second blade track 640', respectively, as described above.

Figure 9:
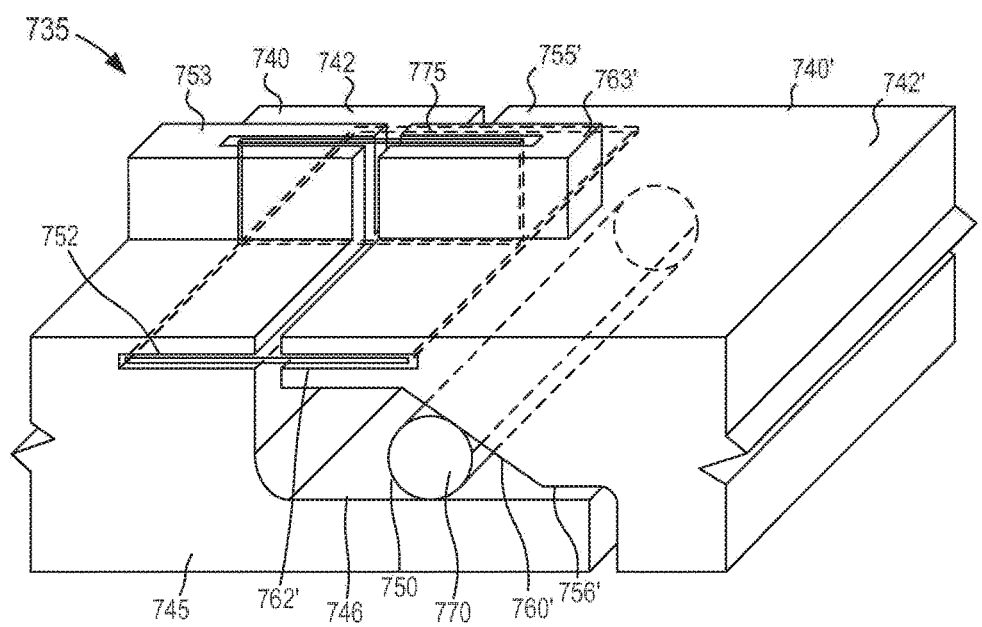

FIG. 9 is a schematic illustration of a portion of a shroud assembly 735 according to another embodiment. The portion of the shroud assembly 735 can be, for example, a portion of the shroud assembly 130 described above with reference to FIGS. 1 and 2. Thus, the portion of the shroud assembly 735 can be used in a turbine and/or compressor of a gas turbine engine such as the gas turbine engine 100 shown in FIG. 1. Moreover, the portion of the shroud assembly 735 can be at least partially similar in form and/or function to the portion of the shroud assembly 635 described above with reference to FIG. 8. Thus, some aspects of the portion of the shroud assembly 735 and/or the corresponding functions thereof are not described in further detail herein.

The portion of the shroud assembly 735 (also referred to herein as a "circumferential assembly") includes a first blade track 740, a second blade track 740', a seal member 770, and a strip seal 775. The seal member 770 can be similar to and/or substantially the same as the seal member 270 described above with reference to FIG. 3. The first blade track 740 (also referred to herein as a "first circumferential member") can be any suitable shape, size, and/or configuration. For example, in this embodiment, the first blade track 740 can be substantially similar to the blade track 540 described above with reference to FIG. 7. Thus, the first blade track 740 includes an end portion 745 that defines a recess 746, which in turn, forms a first seal surface 750, as described in detail above with reference to the first blade track 240 in FIG. 3. Similarly, the second blade track 740' (also referred to herein as a "second circumferential member") can be any suitable shape, size, and/or configuration. For example, in this embodiment, the second blade track 740' can be substantially similar to the second blade track 540' described above with reference to FIG. 7. Thus, the second blade track 740' includes an end portion 755' that defines a recess 756', which in turn, forms a second seal surface 760', as described above with reference to the second blade track 240' in FIG. 3. As shown in FIG. 7, the seal member 770 is configured to be disposed between the end portion 745 of the first blade track 740 and the end portion 755' of the second blade track 740' and in contact with the first seal surface 750, to define a first seal, and the second seal surface 760', to define a second seal, as described in detail above with reference to the seal member 270 in FIG. 3. Thus, the seal member 770 can substantially fluidically isolate a volume on a first side of the seal member 770 from a volume on a second side of the seal member 770, opposite the first side.

While the portion of the shroud assembly 735 is substantially similar to the portion of the shroud assembly 635 in FIG. 8, the portion the shroud assembly 735 can differ from the portion of the shroud assembly 635 is the arrangement of the strip seal 775. For example, as shown in FIG. 8, the first blade track 740 includes a protrusion 753 extending from an inner surface 742. The first blade track 740 defines a slot 752 that extends in a lateral direction (e.g., similar to the slot 652 in FIG. 7) as well as extending through at least a portion of the protrusion 753. In other words, the first blade track 740 defines a substantially T-shaped slot 753. Similarly, the second blade track 740' defines a slot 762' substantially similar to the slot 752 defined by the first blade track 740. Accordingly, the strip seal 775 has a substantially T-shaped cross-sectional shape and is configured to be disposed in the slots 752 and 762' of the first blade track 740 and second blade track 740', respectively, to span and/or cover a gap, opening, space, and/or the like that might otherwise be defined between the end portion 745 of the first blade track 740 and the end portion 755' of the second blade track 740'. Thus, the strip seal 775 and the seal member 770 can collectively limit, reduce, inhibit, and/or otherwise substantially prevent a flow of combustion products through a tortuous flow path defined between the end portions 745 and 755' of the first blade track 740 and the second blade track 740', respectively, as described above. Moreover, the substantially T-shaped arrangement of the strip seal 775 and the slots 752 and 762' of the first blade track 740 and the second blade track 740' can, for example, facilitate alignment of the first blade track 740 and the second blade track 740' during assembly. In addition, the substantially T-shaped arrangement of the strip seal 775 can, in some embodiments, increase a stiffness of the strip seal 775, which in turn, can reduce an amount of deflection and/or deformation that might otherwise result from a pressure exerted on the strip seal 775 during operation. In some embodiments, the T-shaped arrangement of the strip seal 775 can also act to retain the strip seal 775 within the slots 752 and 762' of the first blade track 740 and the second blade track 740', respectively.

Figure 10:
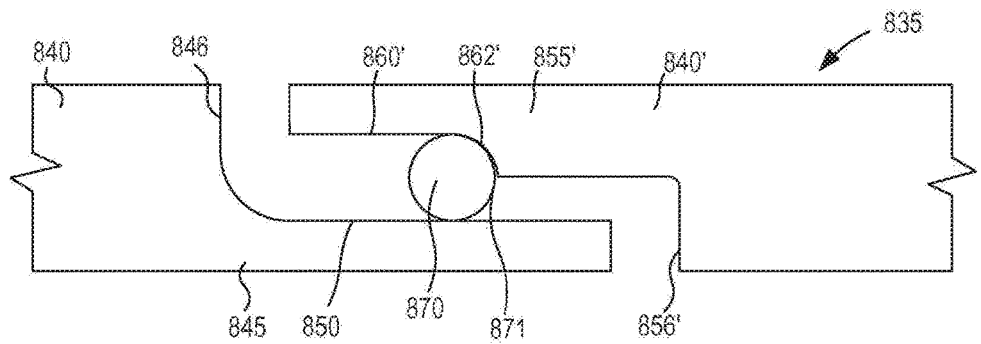
FIGS. 10-13 are each side views of a portion of various blade track assemblies according to various embodiments.

While the portions of the shroud assemblies 235, 335, 435, 535, 635, and 735 have been particularly shown and described above, in other embodiments, a portion of a shroud assembly can include any suitable arrangement of blade tracks and seal members. For example, FIG. 10 is a schematic illustration of a portion of a shroud assembly 835 according to an embodiment. The portion of the shroud assembly 835 can be, for example, a portion of the shroud assembly 130 described above with reference to FIGS. 1 and 2. Thus, the portion of the shroud assembly 835 can be used in a turbine and/or compressor of a gas turbine engine such as the gas turbine engine 100 shown in FIG. 1. Moreover, the portion of the shroud assembly 835 can be at least partially similar in form and/or function to the portion of the shroud assembly 235 described above with reference to FIG. 3. Thus, some aspects of the portion of the shroud assembly 835 and/or the corresponding functions thereof are not described in further detail herein.

The portion of the shroud assembly 835 (also referred to herein as a "circumferential assembly") includes a first blade track 840, a second blade track 840', and a seal member 870. The seal member 870 can be similar to and/or substantially the same as the seal member 270 described above with reference to FIG. 3. The first blade track 840 (also referred to herein as a "first circumferential member") can be any suitable shape, size, and/or configuration. For example, in this embodiment, the first blade track 840 can be substantially similar to the blade track 240 described above with reference to FIG. 3. Thus, the first blade track 840 includes an end portion 845 that defines a recess 846, which in turn, forms a first seal surface 850.

Similarly, the second blade track 840' (also referred to herein as a "second circumferential member") can be any suitable shape, size, and/or configuration. For example, in this embodiment, the second blade track 840' can be substantially similar to the second blade track 240' described above with reference to FIG. 3. Thus, the second blade track 840' includes an end portion 855' that defines a recess 856', which in turn, forms a second seal surface 860'. The second blade track 840' can differ, however, in the arrangement and/or configuration of the second seal surface 860'. More specifically, while the second seal surface 260' is shown as being substantially linear and disposed at an angle relative to the first surface 241' of the second blade track 240', in this embodiment, the second seal surface 860' includes a rounded or curvilinear portion 862'. In some embodiments, the rounded portion 862' can have a radius of curvature associated with a radius of curvature of an outer surface 871 of the seal member 870, as shown in FIG. 10.

In use, the seal member 870 is disposed between the end portion 845 of the first blade track 840 and the end portion 855' of the second blade track 840' and in contact with the first seal surface 850, to define a first seal, and the second seal surface 860', to define a second seal, as described in detail above with reference to the seal member 270 in FIG. 3. Thus, the seal member 870 can substantially fluidically isolate a volume on a first side of the seal member 870 from a volume on a second side of the seal member 870, opposite the first side. Moreover, in this embodiment, the seal member 870 can be in contact with the rounded portion 862' of the second seal surface 860'. For example, as described above with reference to the portion of the shroud assembly 235 in FIG. 3, a pressure exerted during operation can be sufficient to push and/or otherwise force the seal member 870 along the second seal surface 860' and into contact with the rounded portion 862', as shown in FIG. 10. In some embodiments, the radius of curvature of the rounded portion 862' can increase a surface area of the second seal formed between the outer surface 871 of the seal member 870 and the second seal surface 860'. Thus, the seal member 870 can substantially obstruct, block, seal, etc., a space defined between the end portion 845 of the first blade track 840 and the end portion 855' of the second blade track 840'.

Figure 11:
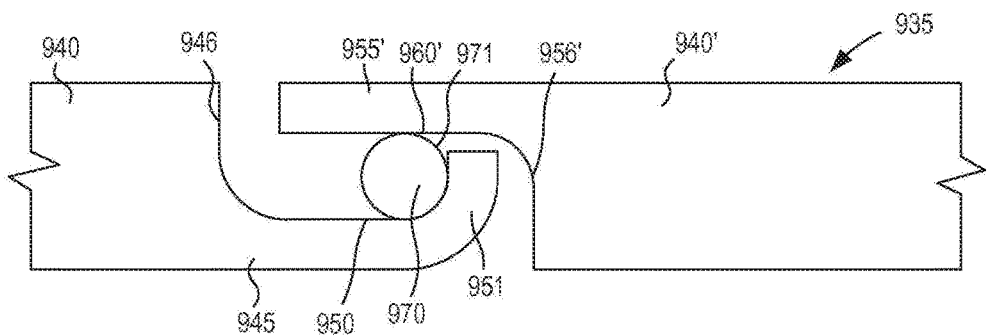

FIG. 11 is a schematic illustration of a portion of a shroud assembly 935 according to another embodiment. The portion of the shroud assembly 935 can be, for example, a portion of the shroud assembly 130 described above with reference to FIGS. 1 and 2. Thus, the portion of the shroud assembly 935 can be used in a turbine and/or compressor of a gas turbine engine such as the gas turbine engine 100 shown in FIG. 1. Moreover, the portion of the shroud assembly 935 can be at least partially similar in form and/or function to the portion of the shroud assembly 235 described above with reference to FIG. 3. Thus, some aspects of the portion of the shroud assembly 935 and/or the corresponding functions thereof are not described in further detail herein.

The portion of the shroud assembly 935 (also referred to herein as a "circumferential assembly") includes a first blade track 940, a second blade track 940', and a seal member 970. The seal member 970 can be similar to and/or substantially the same as the seal member 270 described above with reference to FIG. 3. The first blade track 940 (also referred to herein as a "first circumferential member") can be any suitable shape, size, and/or configuration. For example, in this embodiment, the first blade track 940 can be substantially similar to the blade track 240 described above with reference to FIG. 3. Thus, the first blade track 940 includes an end portion 945 that defines a recess 946, which in turn, forms a first seal surface 950. Moreover, as shown in FIG. 11, the end portion 945 of the first blade track 940 includes a protrusion 951. Expanding further, the protrusion 951 can be a bend, tab, and/or the like extending from the recess 946. In this embodiment, the protrusion 951 has a radius of curvature associated with a radius of curvature of an outer surface of the seal member 970, as described in further detail herein.

The second blade track 940' (also referred to herein as a "second circumferential member") can be any suitable shape, size, and/or configuration. For example, in this embodiment, the second blade track 940' can be substantially similar in at least function to the second blade track 240' described above with reference to FIG. 3. Thus, the second blade track 940' includes an end portion 955' that defines a recess 956', which in turn, forms a second seal surface 960', as described above with reference to the second blade track 240' in FIG. 3. As shown in FIG. 11, the second seal surface 960 can be substantially linear. In some embodiments, the second seal surface 960' can be configured to be substantially parallel to at least a portion of the first seal surface 950 of the first blade track 940 when in use. As shown, the seal member 970 is disposed between the end portion 945 of the first blade track 940 and the end portion 955' of the second blade track 940' and in contact with the first seal surface 950, to define a first seal, and the second seal surface 960', to define a second seal, as described in detail above with reference to the seal member 270 in FIG. 3. Thus, the seal member 970 can substantially fluidically isolate a volume on a first side of the seal member 970 from a volume on a second side of the seal member 970, opposite the first side. Moreover, in this embodiment, the seal member 970 can be in contact with the protrusion 951 extending from the recess 946 of the first blade track 945. For example, as described above with reference to the portion of the shroud assembly 235 in FIG. 3, a pressure exerted during operation can be sufficient to push and/or otherwise force the seal member 970 along the first seal surface 950 and into contact with the protrusion 951. As such, the radius of curvature defined at least in part by the protrusion 951 can increase a surface area of the second seal formed between the outer surface 971 of the seal member 970 and the first seal surface 950. Thus, the seal member 970 can substantially obstruct, block, seal, etc., a space defined between the end portion 945 of the first blade track 940 and the end portion 955' of the second blade track 940'.

Figure 12:
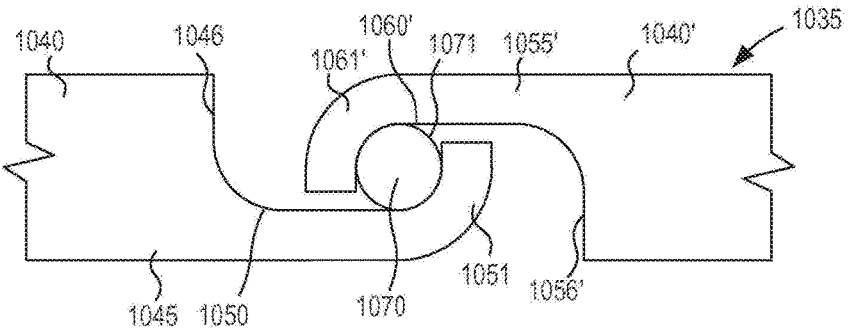

While the portion of the shroud assembly 935 is shown and described above with reference to FIG. 11 as including the first blade track 940 with the protrusion 951 in other embodiments, a portion of the shroud assembly can include a first blade track having a protrusion and/or a second blade track having a protrusion. For example, FIG. 12 is a schematic illustration of a portion of a shroud assembly 1035 according to another embodiment. The portion of the shroud assembly 1035 can be, for example, a portion of the shroud assembly 130 described above with reference to FIGS. 1 and 2. Thus, the portion of the shroud assembly 1035 can be used in a turbine and/or compressor of a gas turbine engine such as the gas turbine engine 100 shown in FIG. 1. Moreover, the portion of the shroud assembly 1035 can be at least partially similar in form and/or function to the portion of the shroud assembly 235 described above with reference to FIG. 3. Thus, some aspects of the portion of the shroud assembly 1035 and/or the corresponding functions thereof are not described in further detail herein.

The portion of the shroud assembly 1035 (also referred to herein as a "circumferential assembly") includes a first blade track 1040, a second blade track 1040', and a seal member 1070. The seal member 1070 can be similar to and/or substantially the same as the seal member 270 described above with reference to FIG. 3. The first blade track 1040 (also referred to herein as a "first circumferential member") can be any suitable shape, size, and/or configuration. For example, in this embodiment, the first blade track 1040 can be substantially similar to the blade track 940 described above with reference to FIG. 11. Thus, the first blade track 1040 includes an end portion 1045 that defines a recess 1046, which in turn, forms a first seal surface 1050. Moreover, the end portion 1045 of the first blade track 1040 includes a protrusion 1051, as described above with reference to the first blade track 940.

The second blade track 1040' (also referred to herein as a "second circumferential member") can be any suitable shape, size, and/or configuration. For example, in this embodiment, the second blade track 1040' can be substantially similar to the second blade track 940' described above with reference to FIG. 11. Thus, the second blade track 1040' includes an end portion 1055' that defines a recess 1056', which in turn, forms a second seal surface 960'. The second blade track 1040', however, can differ from the second blade track 940' in the arrangement and/or configuration of its end portion 1055'. For example, in this embodiment, the end portion 1055' of the second blade track 1040' includes a protrusion 1061' that can be substantially similar to the protrusion 1051 of the first blade track 1040.

In use, the seal member 1070 is disposed between the end portion 1045 of the first blade track 1040 and the end portion 1055' of the second blade track 1040' and in contact with the first seal surface 1050, to define a first seal, and the second seal surface 1060', to define a second seal, as described in detail above with reference to the seal member 270 in FIG. 3. More specifically, the seal member 1070 can be in contact with the first seal surface 1050 and positioned to be in contact with a surface of the protrusion 1051, as shown in FIG. 12. The second blade track 1040' can be positioned such that the protrusion 1061' of the second blade track 1040' is disposed in the recess 1046 defined by the end portion 1045 of the first blade track 1040 and such that the protrusion 1051 of the first blade track 1040 is disposed in the recess 1056' of the second blade track 1040'. Moreover, in this embodiment, the seal member 1070 can be in contact with a surface of the protrusion 1051 of the first blade track 1040 and a surface of the protrusion 1061' of the second blade track 1040'. As such, the radius of curvature defined at least in part by the protrusions 1051 and 1061' of the first blade track 1040 and the second blade track 1040', respectively, can increase a surface area of the first seal and the second seal, respectively. Thus, the seal member 1070 can substantially obstruct, block, seal, etc., a space defined between the end portion 1045 of the first blade track 1040 and the end portion 1055' of the second blade track 1040'.

Figure 13:
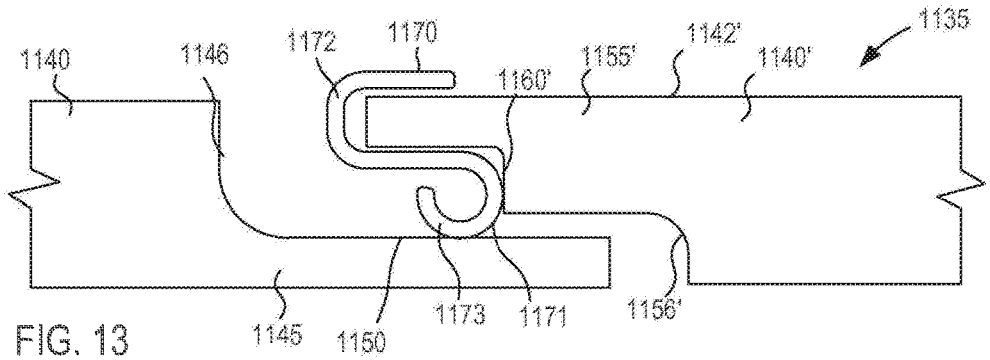

While the seal members 270, 370, 470, 570, 670, 770, 870, 970, and 1070 have been shown and described herein as being substantially cylindrical with a circular cross-sectional shape, in other embodiments, a shroud assembly can include one or more seal members having any suitable shape, size, and/or configuration. For example, FIG. 13 is a schematic illustration of a portion of a shroud assembly 1135 according to an embodiment. The portion of the shroud assembly 1135 can be, for example, a portion of the shroud assembly 130 described above with reference to FIGS. 1 and 2. Thus, the portion of the shroud assembly 1135 can be used in a turbine and/or compressor of a gas turbine engine such as the gas turbine engine 100 shown in FIG. 1. Moreover, the portion of the shroud assembly 1135 can be at least partially similar in form and/or function to the portion of the shroud assembly 235 described above with reference to FIG. 3. Thus, some aspects of the portion of the shroud assembly 1135 and/or the corresponding functions thereof are not described in further detail herein.

The portion of the shroud assembly 1135 (also referred to herein as a "circumferential assembly") includes a first blade track 1140, a second blade track 1140', and a seal member 1170. The first blade track 1140 (also referred to herein as a "first circumferential member") can be any suitable shape, size, and/or configuration. For example, in this embodiment, the first blade track 1140 can be substantially similar to the blade track 240 described above with reference to FIG. 3. Thus, the first blade track 1140 includes an end portion 1145 that defines a recess 1146, and forms a first seal surface 1150. The second blade track 1040' (also referred to herein as a "second circumferential member") can be any suitable shape, size, and/or configuration. For example, in this embodiment, the second blade track 1140' can be substantially similar to the second blade track 840' described above with reference to FIG. 10. Thus, the second blade track 1140' includes an end portion 1155' that defines a recess 1156', which in turn, forms a second seal surface 1160'.

The seal member 1170 can be any suitable shape, size, or configuration. For example, as shown in FIG. 13, the seal member 1170 can be relatively thin strip of material (e.g., a metal, metal alloy, composite, CMC, etc.), which can be formed into a desired shape. In this embodiment, the seal member 1170 includes a first bend portion 1172 and a second bend portion 1173. The first bend portion 1172 is associated with, for example, the end portion 1155' of the second blade track 1140'. More specifically, arrangement of the first bend portion 1172 is such that the a first portion of the seal member 1170 is disposed on or adjacent to an inner surface 1142' of the second blade track 1140' while a second portion of the seal member 1170 is disposed on or adjacent to at least a portion of the recess 1156' defined by the second blade track 1140', as shown in FIG. 13. The second bend portion 1173 can be, for example, semicircular defining a radius of curvature. In use, the seal member 1070 is positioned about the end portion 1155' of the second blade track 1140, as described above. As such, the second bend portion 1153 is disposed between the end portion 1045 (e.g., the first seal surface 1150) of the first blade track 1040 and the end portion 1055' (e.g., the second seal surface 1160') of the second blade track 1040'. In this manner, an outer surface 1171 of the seal member 1170 is in contact with the first seal surface 1150 to define a first seal, and the outer surface 1171 of the seal member 1170 is in contact with the second seal surface 1160' to define a second seal, as described in detail above with reference to the seal member 270 in FIG. 3. Thus, the seal member 1170 can substantially obstruct, block, seal, etc., a space defined between the end portion 1145 of the first blade track 1040 and the end portion 1155' of the second blade track 1140', as described in detail above.

Figure 14:
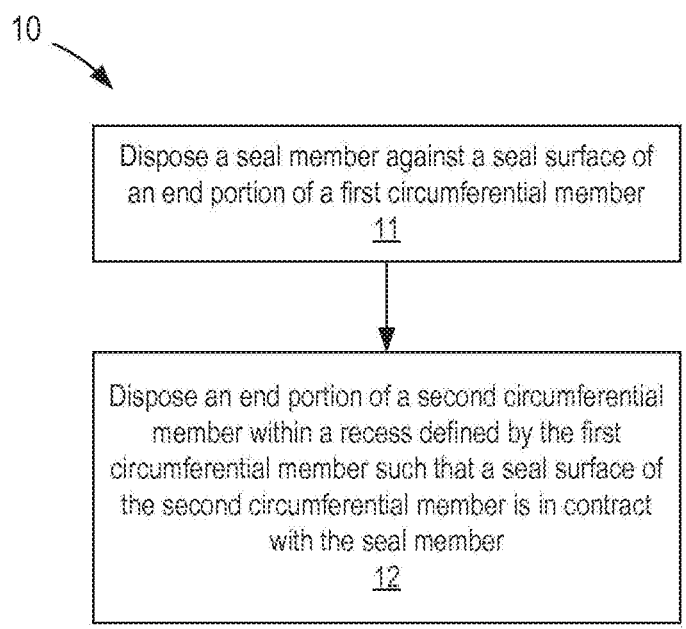
FIG. 14 is a flowchart illustrating a method of forming a blade track assembly according to an embodiment

FIG. 14 is a flowchart illustrating a method 10 of assembling and/or forming at least a portion of a shroud assembly according to an embodiment. The shroud assembly or the portion thereof can be, for example, at least a portion of the shroud assembly 130 described above with reference to FIGS. 1 and 2. Thus, the shroud assembly or the portion thereof can be used in a turbine and/or compressor of a gas turbine engine such as the gas turbine engine 100 shown in FIG. 1. Moreover, the shroud assembly or portion thereof can be substantially similar to any of the portions of the shroud assemblies 235, 335, 435, 535, 635, 735, 835, 935, 1035, and/or 1135 described herein. The method 10 includes disposing a seal member against a seal surface of an end portion of a first circumferential member, at 11. For example, the first circumferential member can be, for example, a first blade track such as those described herein. As such, the end portion of the first circumferential member can define a recess or the like that includes the seal surface. In some embodiments, the seal surface (also referred to herein as a "first seal surface") can be substantially planar or the like. In other embodiments, the end portion can include a protrusion or the like, which can result in a bent portion or radiused portion of the first seal surface, as described above with reference to the first blade tracks 940 and 1040 in FIGS. 11 and 12, respectively. In this manner, the seal member can form a first seal with the seal surface of the first circumferential member (e.g., the first blade track such as those described herein).

With the seal member in contract with the seal surface of the first circumferential member, an end portion of a second circumferential member is disposed within the recess defined by the first circumferential member such that a seal surface of the second circumferential member is in contract with the seal member, at 12. For example, the second circumferential member can be, for example, a second blade track such as those described herein. As such, the second circumferential member can be positioned adjacent to the first circumferential member such that the end portion of the second circumferential member overlaps the end portion of the first circumferential member. Thus, with the end portion of the second circumferential member disposed in the recess, the end portion of the second circumferential member and the end portion of the first circumferential member collectively form, for example, a lap joint or the like. Moreover, the seal member can be positioned along the first seal surface such that when the end portion of the second circumferential member is disposed in the recess, the seal member is in contact with the seal surface of the second circumferential member (also referred to herein as "second seal surface"). In this manner, the seal member and the second seal surface can define a second seal, as described in detail above with reference to specific embodiments. Thus, the seal member can substantially obstruct, block, seal, etc., a space defined between the end portion of the first circumferential member and the end portion of the second circumferential member, as described in detail above.

Although not shown or described above, any of the components (e.g., the blade tracks and/or seal members) included in the embodiments herein can receive and/or include a coating or the like that can enhance one or more properties associated with, for example, a shroud assembly included in a gas turbine engine. More specifically, CMC components such as shroud assemblies (e.g., including portions similar to those described herein) can be coated to reduce corrosion and/or oxidation that might other result from being in communication with a combustion environment. Such coatings can include, for example, yttrium disilicate, Barium-Strontium-Alumino-Silicate (BSAS), and/or the like. Thus, by forming a shroud assembly from a number of blade tracks or blade track segments and a corresponding number of seal members, as described in the embodiments herein, can allow substantially all surfaces of the blade tracks and seal members to be coated without a need for special equipment or otherwise labor intensive processes (e.g., coated via an air-plasma spray (APS) process).

While various embodiments have been described above, it should be understood that they have been presented by way of example only, and not limitation. Where schematics and/or embodiments described above indicate certain components arranged in certain orientations or positions, the arrangement of components may be modified, which in some instances, can allow for additional usage thereof. For example, although the shroud assemblies have been described herein as being turbine shroud assemblies, in other embodiments, any of the structures and methods described herein can be used to form a shroud assembly or the like used in conjunction with a compressor or a combustion chamber of a gas turbine engine.

Moreover, although the assemblies shown and described above have included surfaces identified as being "inner" and "outer" surfaces, in some embodiments, a surface identified herein as being an "inner" surface can be positioned and/or aligned to be an "outer surface" of a circumferential assembly, and vice-versa.

While the embodiments have been particularly shown and described, it will be understood that various changes in form and details may be made. For example, while the seal member 270 is shown in FIG. 3 as being substantially cylindrical having a circular cross-sectional shape, in other embodiments, a seal member can have any suitable cross-sectional shape such as semi-circular, oblong, polygonal (e.g., pentagonal, hexagonal, octagonal, etc.), trapezoidal, and/or suitable cross-sectional shape. For example, in some embodiments, a retention pin can have a circular cross-sectional shape, a polygonal cross-sectional shape, or the like. Although various embodiments have been described as having particular features and/or combinations of components, other embodiments are possible having a combination of any features and/or components from any of embodiments as discussed above. For example, a strip seal such as the strip seal 575 can be disposed on an outer surface of adjacent blade tracks having any suitable configuration. By way of another example, while the seal member 270 is described, in some instances, a dampening a relative movement and/or force between the end portions 245 and 255' of the first blade track 240 and the second blade track 250', respectively, any of the seal members described herein can be disposed between end portions of adjacent blade tracks of a shroud assembly and, in addition to forming a seal therebetween, can dampen a relative movement and/or force between the end portions.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud apparatus adapted for use in a gas turbine engine to surround a turbine wheel assembly and block combustion products from passing over the tips of blades included in the turbine wheel assembly, the apparatus comprising a first circumferential member comprising ceramic matrix composite materials, the first circumferential member shaped to extend partway about a central axis, an end portion of the first circumferential member defining a recess and including a first seal surface;

a second circumferential member comprising ceramic matrix composite materials, the second circumferential member shaped to extend partway about the central axis, an end portion of the second circumferential member configured to be at least partially disposed within the recess of the first circumferential member, the end portion of the second circumferential member including a second seal surface; and a seal member configured to seal a gap between the first circumferential member and the second circumferential member, the seal member having a cylindrical shape that defines an seal axis arranged parallel to the central axis, the first circumferential member and the second circumferential forming at least a portion of a circumferential assembly of a gas turbine when the end portion of the second circumferential member is at least partially disposed within the recess of the first circumferential member, the first seal surface configured to form a first seal with the seal member and the second seal surface configured to form a second seal with the seal member when the end portion of the second circumferential member is at least partially disposed within the recess of the first circumferential member.

2. The apparatus of claim 1, wherein a line normal to the first seal surface intersects the second seal surface.

3. The apparatus of claim 1, wherein the first seal surface and the second seal surface define an acute angle.

4. The apparatus of claim 1, wherein the end portion of the first circumferential member includes a protrusion including the first seal surface; and the end portion of the second circumferential member defines a recess, the protrusion configured to be disposed within the recess of the second circumferential member when the end portion of the second circumferential member is at least partially disposed within the recess of the first circumferential member.

5. The apparatus of claim 1, wherein the end portion of the first circumferential member is a first end portion;

the seal member is a first seal member; and the first circumferential member includes a second end portion configured to be at least partially disposed within a recess of a third circumferential member, the second end portion of the first circumferential member including a third seal surface configured to form a seal with a second seal member.

6. The apparatus of claim 1, wherein the end portion of the first circumferential member defines the recess having a first portion and a second portion, the first portion of the recess including the first seal surface, the second portion of the recess configured to receive a tab extending from the end portion of the second circumferential member when the end portion of the second circumferential member is at least partially disposed within the recess of the first circumferential member.

7. A turbine shroud apparatus adapted for use in a gas turbine engine, the apparatus comprising a first circumferential member shaped to extend partway around a central axis, an end portion of the first circumferential member including a first seal surface;

a second circumferential member shaped to extend partway around the central axis, an end portion of the second circumferential member including a second seal surface, the end portion of the second circumferential member configured to be disposed adjacent to the end portion of the first circumferential member such that a line normal to the second seal surface intersects the first seal surface; and a seal member configured to seal a gap between the first circumferential member and the second circumferential member, the seal member having a cylindrical shape with a forward end of the seal member arranged forward of an aft end of the seal member and having a round surface that extends from the forward end to the aft end, the first seal surface configured to form a first seal with the seal member and the second seal surface configured to form a second seal with the seal member when the end portion of the second circumferential member is disposed adjacent to the end portion of the first circumferential member, the first circumferential member, the second circumferential member, and the seal member configured to collectively form at least a portion of a circumferential assembly of a gas turbine when the seal member forms the first seal and the second seal.

8. The apparatus of claim 7, wherein the first seal surface and the second seal surface define an acute angle.

9. The apparatus of claim 7, wherein the end portion of the first circumferential member defines a recess including the first seal surface; and the end portion of the second circumferential member configured to be disposed within the recess of the first circumferential member when the end portion of the second circumferential member is disposed adjacent to the end portion of the first circumferential member.

10. The apparatus of claim 7, wherein the first circumferential member includes an inner surface, the end portion of the first circumferential member defines a recess including the first seal surface, the first seal surface being substantially parallel to the inner surface of the first circumferential member; and the second circumferential member includes an inner surface, the second seal surface being non-parallel to the inner surface of the second circumferential member, the end portion of the second circumferential member configured to be disposed within the recess of the first circumferential member when the end portion of the second circumferential member is disposed adjacent to the end portion of the first circumferential member, the inner surface of the first circumferential member and the inner surface of the second circumferential member having a substantially similar radius of curvature such that when the end portion of the second circumferential member is disposed adjacent to the end portion of the first circumferential member, at least the portion of the circumferential assembly has a substantially constant inner diameter.

11. The apparatus of claim 7, wherein the seal member is formed from a ceramic matrix composite (CMC) material.

12. The apparatus of claim 7, wherein the end portion of the first circumferential member is a first end portion;

the seal member is a first seal member; and the first circumferential member includes a second end portion opposite the first end portion, the second end portion including a third seal surface, the second end portion configured to be disposed adjacent to an end portion of a third circumferential member such that a line normal to the second seal surface intersects a fourth sealing surface, the fourth sealing surface included in the end portion of the third circumferential member, the third seal surface configured to form a seal with a second seal member and the fourth seal surface configured to form a seal with the second seal member when the second end portion of the first circumferential member is disposed adjacent to the end portion of the third circumferential member.

13. The apparatus of claim 7, wherein the end portion of the first circumferential member defines a recess and includes a protrusion, at least one of the recess of the first circumferential member or the protrusion of the first circumferential member including the first seal surface;

the end portion of the second circumferential member defines a recess and includes a protrusion, at least one of the recess of the second circumferential member or the protrusion of the second circumferential member including the second seal surface; and the protrusion of the first circumferential member configured to be disposed within the recess of the second circumferential member and the protrusion of the second circumferential member configured to be disposed within the recess of the first circumferential member when the end portion of the second circumferential member is disposed adjacent to the end portion of the first circumferential member.

14. A method of assembling a turbine shroud apparatus for use in a gas turbine engine with a central axis of rotation, the method comprising disposing a cylindrical seal member that extends parallel to the central axis of rotation against a seal surface of an end portion of a first circumferential member; and disposing an end portion of a second circumferential member within a recess defined by the first circumferential member such that a seal surface of the second circumferential member is in contact with the seal member, the first circumferential member and the second circumferential forming at least a portion of a circumferential assembly of a gas turbine.

15. The method of claim 14, wherein a line normal to the seal surface of the first circumferential member intersects the seal surface of the second circumferential member when the end portion of the second circumferential member is disposed within the recess defined by the first circumferential member.

16. The method of claim 14, further comprising disposing at least one of a petroleum jelly or an adhesive about at least a portion of the seal member to at least temporarily retain the seal member against the seal surface of the first circumferential member and against the seal surface of the second circumferential member.

* * * * *